Jan. 13, 1925.  
E. V. NOSER  
1,522,740  
TRANSMISSION LOCK FOR MOTOR VEHICLES  
Filed May 4, 1923
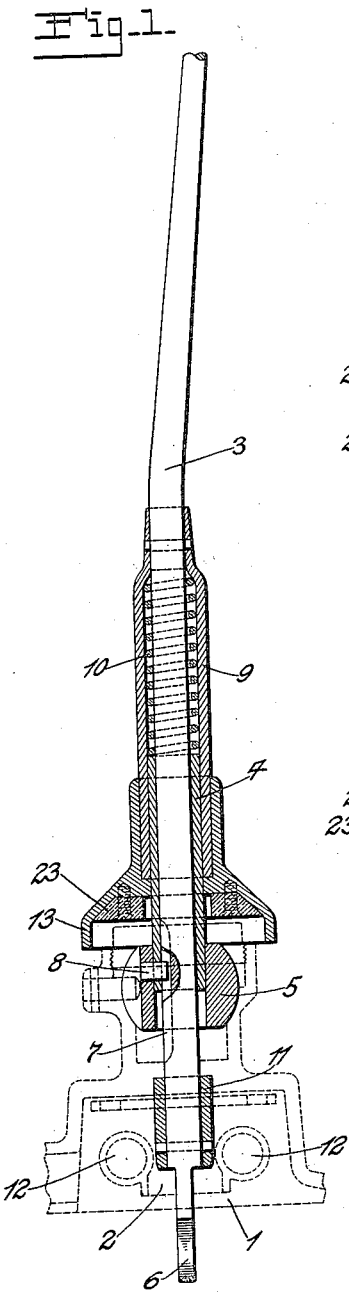
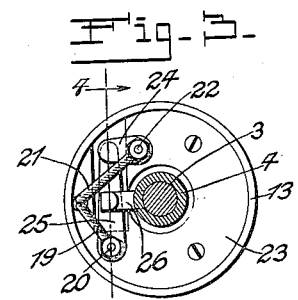
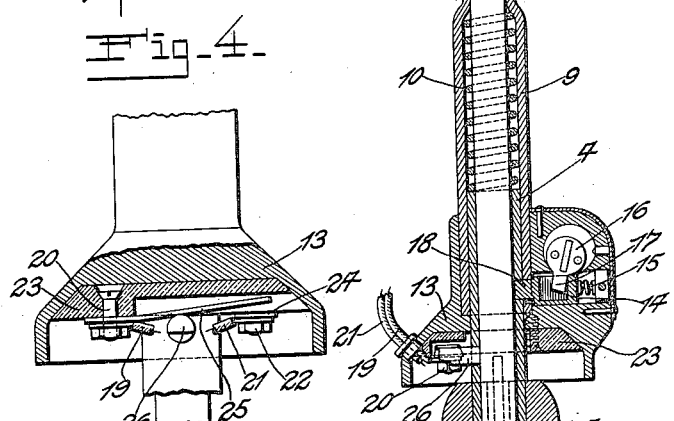
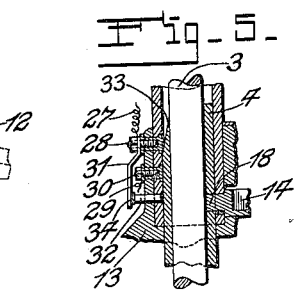
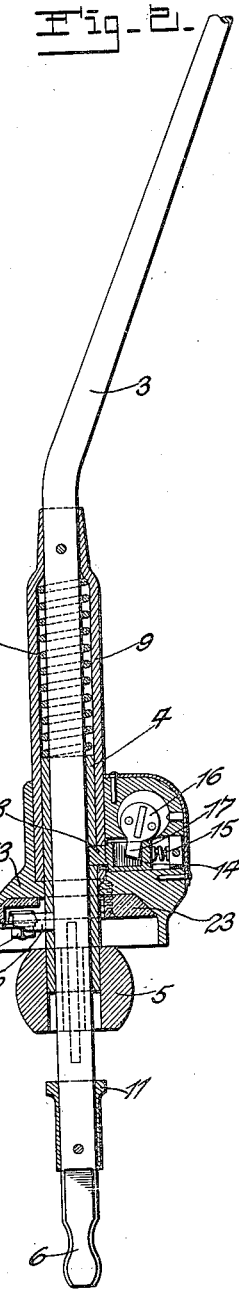
Inventor:  
Emil V. Noser,  
by Rippey Kingsland,  
His Attorneys.

Patented Jan. 13, 1925.

1,522,740

UNITED STATES PATENT OFFICE.

EMIL V. NOSER, OF ST. LOUIS, MISSOURI, ASSIGNOR TO NOSER INSTANT AUTO LOCK COMPANY, OF ST. LOUIS, MISSOURI, A CORPORATION OF MISSOURI.

TRANSMISSION LOCK FOR MOTOR VEHICLES.

Application filed May 4, 1923. Serial No. 636,698.

*To all whom it may concern:*

Be it known that I, EMIL V. NOSER, a citizen of the United States, residing at St. Louis, Missouri, have invented a new and useful Transmission Lock for Motor Vehicles, of which the following is a specification.

This invention relates to locks for the transmission mechanism of motor vehicles, and has further reference to means for opening and closing the electric circuit automatically and as an incident to the operation of the lock.

An object of the invention is to provide an improved construction and arrangement for utilizing the shift lever of a motor vehicle is a locking member to prevent manipulation of the transmission mechanism and also to prevent operation of the shift lever.

Another object of the invention is to provide improved means for locking the shift lever and transmission mechanism automatically and as an incident to the stopping of the engine and, further, to make it impossible to start the engine when said lever and mechanism are locked.

Another object of the invention is to provide a construction in which the electric circuit of the ignition system will be closed automatically and as an incident to the unlocking of the shift lever and transmission mechanism.

In the drawing Fig. 1 is a vertical sectional view showing the shift lever in position to lock the transmission mechanism and also the lever against operation.

Fig. 2 is a vertical sectional view taken approximately at right angles to the section of Fig. 1, showing parts of the device by which the electric circuit of the ignition system is opened automatically and as an incident to the locking of the shift lever and transmission mechanism and is closed automatically and as an incident to the unlocking of said parts.

Fig. 3 is an inverted plan view of the device by which the electric circuit is opened and closed.

Fig. 4 is an enlarged sectional view on the line 4—4 of Fig. 3.

Fig. 5 shows a modified form of device for opening and closing the electric circuit of the ignition system.

The gear shifting elements include a sliding part 1 movable in one direction from a neutral position, a sliding part 2 movable in the opposite direction from neutral position, said parts 1 and 2 being incapable of movement in the same direction from neutral position as is well understood.

My invention comprises a lever 3 operable to shift the parts 1 and 2 selectively so as to change the speed of the vehicle or to reverse the direction of travel, and means for utilizing said lever to lock the transmission mechanism as well as the lever automatically and as an incident to opening of ignition circuit to stop the engine.

The lever 3 extends for sliding movements through a tube 4 which is attached to a ball pivot 5. The lever 3 extends entirely through the ball 5 and has a part 6 on its lower end which is of reduced thickness so that the lever may be operated to engage said reduced portion 6 with the parts 1 and 2 selectively, it being understood that when the reduced portion 6 is in engagement with one of the parts 1—2 it is out of engagement with the other one of said parts. The lever 3 has a groove 7 in one side thereof receiving the inner end of a pin 8 rigidly supported in the ball 5 and extending through the tube 4 into said groove. The lever 3 is thereby held from rotation but may be moved vertically to and from locked position.

A sleeve 9 on the lever 3 telescopes over the upper end of the tube 4 and encloses a coiled spring 10 of the expansion type, the lower end of which bears upon the upper end of the tube 4, and the upper end of which bears against an inside shoulder on the sleeve 9. The power of the spring is exerted to raise the lever 3 to unlocked position in which the reduced portion 6 of said lever may be selectively engaged with the parts 1 and 2 as desired.

A plug 11 is attached to the lever 3 below the ball 5 and above the reduced portion 6 and when the lever is in its lower position, as shown, the plug is between the two supporting shafts 12 on which the parts 1 and 2 are mounted and in such relation to said parts 1 and 2 that the lever cannot be operated to shift either of said parts 1 and 2. This is because the lever cannot be oscillated laterally out of engagement with either of the parts 1—2 and, since the parts 1—2 cannot be moved in the same direction from neutral position, it is obvious that the shift mechanism is locked.

A cap 13 is rigid with the lower end of the sleeve 9 and supports a locking device for locking the lever 3 in its lower position in which the plug 11 occupies the position shown with respect to the parts 1 and 2 and the supporting shafts 12. Said lock may be of any suitable design and, as shown, comprises a lock bolt 14 actuated inwardly to locking position by a spring 15, and a rotary key-controlled barrel 16 having an arm 17 engaging the bolt 14 for withdrawing the bolts from locking position. The tube 4 has a hole 18 for receiving the inner end of the bolt 14. Since the tube 4 is incapable of axial movement it is obvious that when the lever 3 is in its lower position with the bolt 14 engaged in the hole 18, the parts will be locked.

My invention also comprises means for insuring or requiring locking of the transmission mechanism as an incident to the opening of the electric circuit of the ignition mechanism to stop running of the engine. As shown the two wires of the electric circuit of the ignition mechanism pass through the cap 13, the wire 19 being attached to a binding post 20 and the wire 21 being attached to a binding post 22 supported and enclosed within the cap 13. A plug 23 of insulating material is secured within the cap 13 and supports the binding posts 20 and 22 insulated from all metallic parts not directly associated therewith. A contact member 24 is supported by the binding post 22, and a resilient contact member 25 is supported by the binding post 20 and is in contact with the member 24 when the shift lever is in its raised or unlocked position, but is separated from the contact member 24 automatically and as an incident to the locking of the shift lever and transmission mechanism. For this purpose a projection 26 of insulating material is attached to the tube 4 in position to be engaged by the contact member 25 when the shift lever is depressed to locking position. The relationship of the parts is such that the projection 26 holds the contact member 25 out of contact with the contact member 24 when the lock bolt 14 is engaged in the hole 18. Thus it is necessary to lock the transmission mechanism as an incident to stopping running of the engine by opening the electric circuit of the ignition mechanism, but the circuit is closed automatically and as an incident to the movement of the shift lever from locking position, and vice versa.

In Fig. 5 I have shown another form of mechanism requiring the locking of the transmission mechanism as an incident to the stopping of the engine. As there shown the electric circuit wire 27 of the ignition mechanism is attached to an insulated binding post 28, while the other electric circuit wire 29 of the ignition mechanism is attached to an insulated binding post 30. A circuit make and break device comprising a leaf spring 31 attached to one of the binding posts is movable into and out of contact with the other binding post in order to close and to open the circuit. A plunger 32 is operative to move the part 31 out of contact with one of the binding posts to open the circuit as an incident to the locking of the transmission mechanism. In the embodiment shown the switch device described is supported by the parts attached to the lever 3, a cam 33 being formed on the tube 4 to permit the plunger 32 to move inwardly when the lever 3 is raised to operative position. This permits the spring member 31 to actuate the plunger 32 inwardly and to make contact with the binding post 30 automatically and as an incident to the unlocking of the transmission mechanism. This construction also requires the locking of the transmission mechanism in order to open the electric circuit of the ignition mechanism to stop the engine. In case the plunger 32 is metallic an insulation piece 34 may be utilized to prevent contact of the metallic parts.

From the foregoing it will be seen that my invention obtains all of its intended objects and purposes with a high degree of efficiency and simplicity. I am aware that the construction and relationship of the parts may be varied without departure from the nature and principle of the invention and I do not restrict myself unessentially, but what I claim and desire to secure by Letters Patent is:—

1. In a device of the character described, an element mounted for rocking movements, a tube rigid with said element and extending upwardly therefrom, a rod extending through said tube and through said element and being axially movable therethrough, a sleeve having one end attached to said rod and the other end enclosing the upper end of said tube, a spring within said sleeve exerting its power to raise said rod, and a lock device supported by said sleeve for holding said rod in its lower position in opposition to said spring.

2. In a device of the character described, an element mounted for rocking movements, a tube rigid with said element and extending upwardly therefrom, a rod extending through said tube and through said element and being axially movable therethrough, a sleeve having one end attached to said rod and the other end enclosing the upper end of said tube, a spring within said sleeve exerting its power to raise said rod, a lock device supported by said sleeve for holding said rod in its lower position in opposition to said spring, a plug rigid with said rod below said element, and a reduced portion of said rod extending downwardly beyond said plug.

3. In a device of the character described, an element mounted for rocking movements, a tube rigid with said element and extending upwardly therefrom, a rod extending through said tube and through said element and being axially movable therethrough, a sleeve having one end attached to said rod and the other end enclosing the upper end of said tube, a spring within said sleeve exerting its power to raise said rod, a lock device supported by said sleeve for holding said rod in its lower position in opposition to said spring, an electric circuit switch supported by said sleeve, and means for opening said switch as an incident to movement of said rod to its lower position.

4. A device of the character described, comprising an axially movable rod, means for locking said rod in one position to which it is axially movable, an electric circuit switch supported by said rod, and a stationary member for opening said switch as an incident to movement of said rod to the position in which it is locked.

5. A device of the character described, comprising an axially movable rod, means for locking said rod in one position to which it is axially movable, an electric circuit switch supported by said rod, a stationary member for opening said switch as an incident to movement of said rod to the position in which it is locked, and shiftable elements locked by said rod in the position in which said rod is locked.

6. A device of the character described, comprising an axially movable rod, means for locking said rod in one position to which it is axially movable, an electric circuit switch supported by said rod, a stationary member for opening said switch as an incident to movement of said rod to the position in which it is locked, and means for preventing said rod from turning from position in which said switch will be opened as aforesaid.

7. A device of the character described, comprising an axially movable rod, means for locking said rod in one position to which it is axially movable, an electric circuit switch supported by said rod, a stationary member for opening said switch as an incident to movement of said rod to the position in which it is locked, shiftable elements locked by said rod in the position in which said rod is locked, and means for preventing said rod from turning from position in which said switch will be opened as aforesaid.

8. A device of the character described, comprising an element mounted for rocking movements in various directions, a tube rigid with said element, a rod extending through said tube and said element for axial movements therethrough, means for preventing said rod from turning relative to said tube and said element, a spring encircling said rod above said tube and arranged to actuate said rod upwardly, a sleeve encircling said spring and enclosing the upper end of said tube, a lock supported by said sleeve and arranged to engage said tube to hold said rod in its lower position in opposition to said spring, shiftable elements below said rocking element, and a part on said rod arranged to pass between said shiftable elements and hold said rod from oscillation and to lock said shiftable elements.

9. A device of the character described, comprising an element mounted for rocking movements in various directions, a tube rigid with said element, a rod extending through said tube and said element for axial movements therethrough, means for preventing said rod from turning relative to said tube and said element, a spring encircling said rod above said tube and arranged to actuate said rod upwardly, a sleeve encircling said spring and enclosing the upper end of said tube, a lock supported by said sleeve and arranged to engage said tube to hold said rod in its lower position in opposition to said spring, shiftable elements below said rocking element, a part on said rod arranged to pass between said shiftable elements and hold said rod from oscillation and to lock said shiftable elements, an electric circuit switch, and means for opening said switch as an incident to the movement of said rod to the position in which it is locked.

EMIL V. NOSER.